United States Patent [19]

Hoofnagle et al.

[11] Patent Number: 4,673,500
[45] Date of Patent: Jun. 16, 1987

[54] SAND SEPARATION AND REMOVAL METHOD AND APPARATUS

[75] Inventors: Rodger A. Hoofnagle, Opelousas, La.; William S. Young, The Woodlands, Tex.

[73] Assignee: Amoco Corporation, Chicago, Ill.

[21] Appl. No.: 723,244

[22] Filed: Apr. 15, 1985

[51] Int. Cl.$^4$ .............................................. B01D 27/00
[52] U.S. Cl. ................................... 210/307; 210/313; 210/334; 210/DIG. 5
[58] Field of Search ........... 210/DIG. 5, 323.1, 323.2, 210/332, 334, 295, 299, 307, 314, 316, 312, 313

[56] References Cited

U.S. PATENT DOCUMENTS

| | | | |
|---|---|---|---|
| 2,929,503 | 3/1960 | Ambuster et al. | 210/DIG. 5 |
| 2,959,289 | 11/1960 | Figert et al. | 210/DIG. 5 |
| 3,048,275 | 8/1962 | Headrick | 210/DIG. 5 |
| 3,182,800 | 5/1965 | Kasten et al. | 210/DIG. 5 |

Primary Examiner—Frank Sever
Attorney, Agent, or Firm—S. H. Brown; F. E. Hook

[57] ABSTRACT

Methods and apparatus for separating and removing sand from fluid streams are provided. The apparatus is comprised of a closed separator vessel having first and second compartments therein. An inlet connection is attached to the vessel for introducing the fluid stream into the first compartment and filter means for separating sand from the fluid stream are disposed within the first compartment. The fluid stream is caused to flow from the first compartment through the filter means into the second compartment from where the fluid stream is removed by way of an outlet connection attached to the vessel. Conduit means attached through a wall of the vessel are disposed within the first compartment for conducting and periodically discharging sand wash liquid thereinto. Second filter means are connected to the conduit means for discharging the wash liquid and preventing sand from entering and clogging the conduit means and at least one sand outlet connection for periodically withdrawing wash liquid and sand from the first compartment is attached to the vessel.

6 Claims, 7 Drawing Figures

SAND SEPARATION AND REMOVAL METHOD AND APPARATUS

BACKGROUND OF THE INVENTION

1. Field of the Invention

This invention relates to methods and apparatus for separating and removing sand from fluid streams, and more particularly, but not by way of limitation, to fluid stream sand separation and removal methods and apparatus which utilize one or more sand filters for facilitating sand separation.

2. Setting of the Invention

Fluid streams produced by oil and gas wells often contain subterranean formation sand which can range in size from fine to relatively coarse particles. If not removed, the sand causes the rapid erosion of metal surfaces contacted by the fluid stream such as tubular goods, valves and vessel internals.

Various methods and apparatus which utilize filter means for separating sand from fluid streams have been developed and used heretofore. Such methods and apparatus generally involve the use of one or more removable filters disposed within a separator vessel arranged whereby the fluid stream containing sand is caused to slow down and change direction in a first compartment in the vessel and then flow from the first compartment through the filters into a second compartment from where the filtered fluid stream is withdrawn. The combination of changing the direction of flow slowing the velocity and filtering the fluid stream causes sand to be separated therefrom and to be accumulated in the first compartment. In order to remove the sand from the first compartment in the vessel, a sand wash liquid, most commonly water, is periodically introduced into the first compartment while simultaneously withdrawing sand and wash liquid therefrom by way of one or more outlet connections attached thereto.

The introduction of the wash liquid has heretofore been accomplished by discharging it from one or more slotted or perforated wash pipes disposed in the lower portion of the first compartment of the separator vessel. A problem encountered in the use of such sand separators is that sand often finds its way into the slotted or perforated wash pipe whereby the pipe becomes clogged and the introduction of wash liquid into the separator prevented. This in turn requires that the separator be shut down and opened so that sand in the separator and wash pipe can be manually removed therefrom.

Another problem experienced with prior sand separators utilizing sand wash removal systems is that the sand outlet connections and shut-off valves connected thereto often become clogged with sand. As the sand settles in the bottom of the separator vessel, it packs into the sand outlet connections. The wash liquid discharged in the separator vessel often cannot fluidize such packed sand in the connections whereby the accumulated sand and wash liquid cannot be efficiently removed, again requiring that the separator be shut down and cleaned out. Occasionally, even where the sand outlet connections are not plugged, the shut-off valves connected to the outlet connections bridge over with sand whereby sand and wash liquid removal is prevented.

There is a need for a fluid stream sand separation and removal method and apparatus which utilize filter means for final sand separation and wash liquid for sand removal wherein wash pipe, sand outlet connection and shut-off valve clogging is substantially prevented.

SUMMARY OF THE INVENTION

The present invention has been developed to overcome the foregoing deficiencies and meet the above-described needs. The apparatus of the present invention is comprised of a closed separator vessel having first and second compartments formed therein by a partition sealingly connected within the vessel and having at least one opening therein. An inlet connection is attached to the vessel for introducing a fluid stream into the first compartment and first filter means for separating sand from the fluid stream are disposed within the first compartment. The first filter means are sealingly connected to the opening in the partition so that the fluid stream is caused to flow from the first compartment through the first filter means into the second compartment and sand separated from the fluid stream accumulates in the first compartment. A fluid stream outlet connection is attached to the vessel for withdrawing the fluid stream from the second compartment and conduit means are attached through a wall of the vessel and disposed within the first compartment for conducting and periodically discharging sand wash liquid thereinto. Second filter means are disposed within the first compartment connected to the sand wash liquid conduit means whereby the wash liquid is periodically discharged through the second filter means and sand is prevented from entering and clogging the conduit means in the interim. At least one sand outlet connection is attached to the vessel for periodically withdrawing sand and sand wash liquid from the first compartment.

The method and apparatus of the present invention are particularly useful for separating and removing sand from produced well fluids prior to the well fluids' entry into other production and processing equipment in that shut-downs for manually cleaning sand from the separator vessel, wash pipe, sand outlets and shut-off valves are substantially prevented.

DETAILED DESCRIPTION OF PREFERRED EMBODIMENT

The present invention provides a method and apparatus for separating and removing sand from a fluid stream. The apparatus comprises a closed separator vessel which is divided into first and second compartments by a partition having at least one opening therein sealingly disposed within the vessel. An inlet connection is attached to the vessel for introducing a fluid stream into the first compartment and first filter means for separating sand from the fluid stream are disposed within the first compartment. The first filter means are sealingly connected to the opening in the partition so that the fluid stream is caused to flow from the first compartment through the first filter means into the second compartment and sand separated from the fluid stream accumulates in the first compartment. A fluid stream outlet connection is attached to the vessel for withdrawing the fluid stream from the second compartment. Conduit means attached through a wall of the vessel are disposed within the first compartment for conducting and periodically discharging sand wash liquid thereinto and second filter means are disposed within the first compartment connected to the conduit means. Wash liquid is periodically discharged through the second filter means and sand is prevented from entering and clogging the conduit means in the interim by the second filter means. At least one sand outlet connection is attached to the vessel for periodically withdrawing sand and sand wash liquid from the first compartment thereof.

Referring now to the drawings, the apparatus for separating and removing sand from a fluid stream of the present invention is illustrated and generally designated by the numeral 10. The apparatus 10 is comprised of a closed separator vessel 11 having a fluid stream inlet connection 12 attached at one end and a fluid stream outlet connection 14 attached near the other end at the top of the vessel 11. The vessel 11 is preferably horizontal as illustrated, and preferably includes a flanged connection 16 adjacent the end containing the inlet connection 12 whereby the end can be removed to provide access to the interior of the vessel 11. In addition, a second removable closure member 18 is provided attached to the bottom o the vessel 11 for facilitating the clean-out of the vessel.

Figure 4:
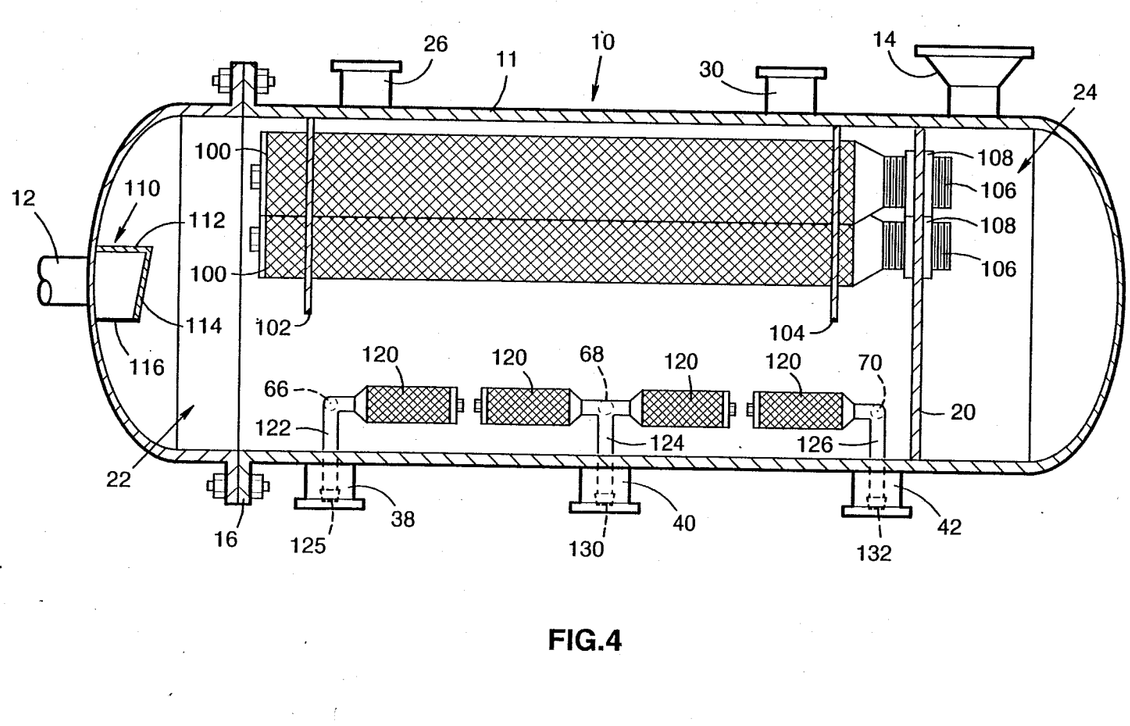
FIG. 4 is a cross-sectional view taken along line 4—4 of FIG. 2.
Figure 5:
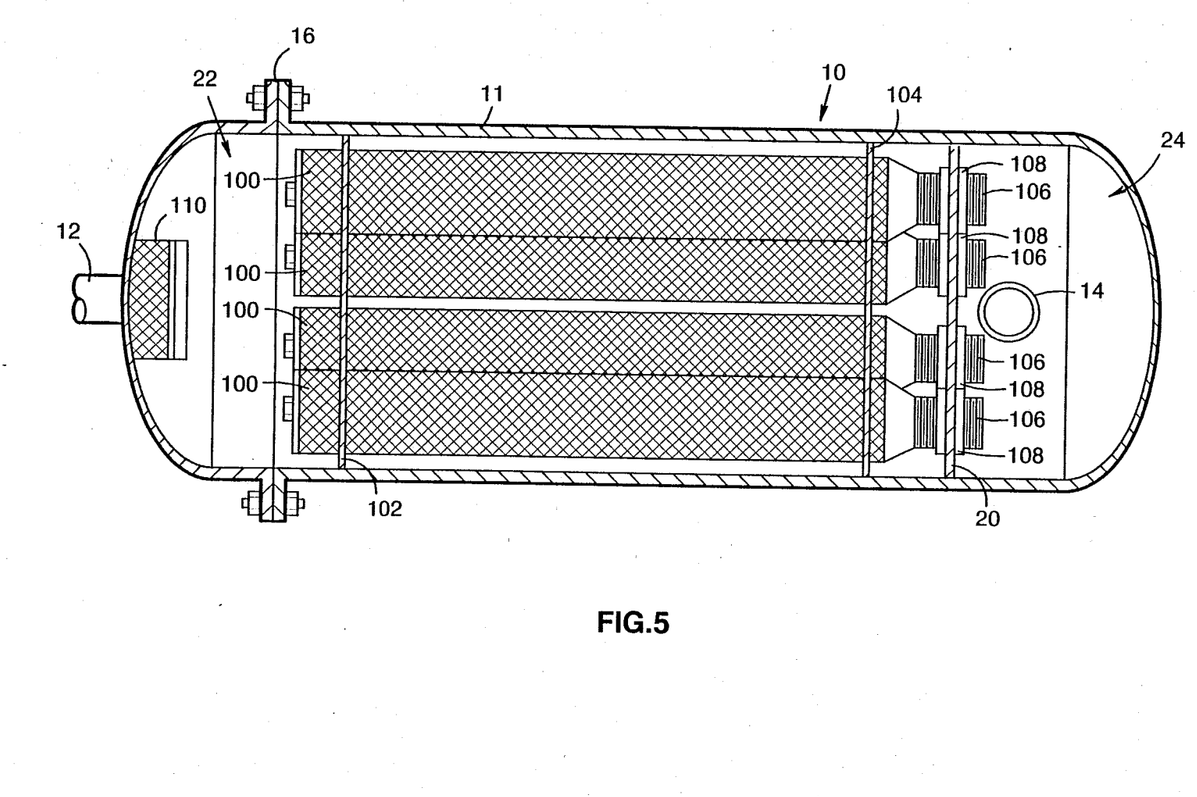
FIG. 5 is a cross-sectional view taken along line 5—5 of FIG. 2.
Figure 6:
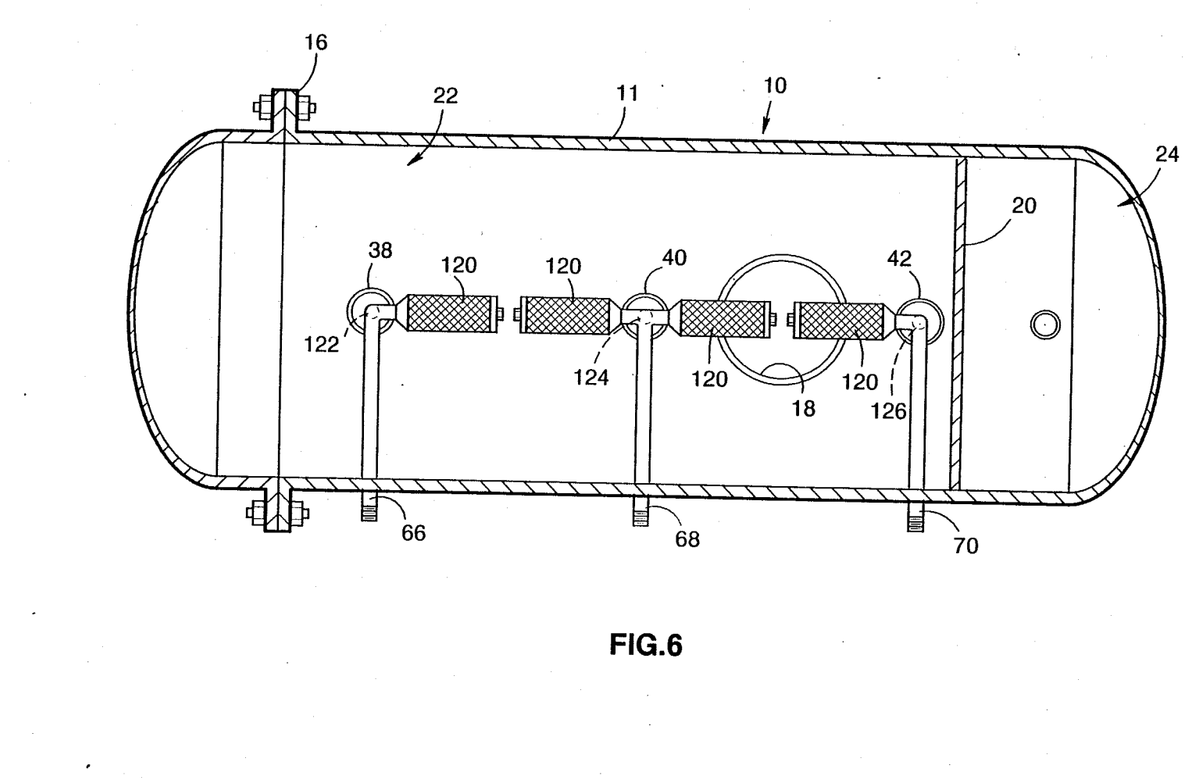
FIG. 6 is a cross-sectional view taken along line 6—6 of FIG. 2.

As best shown in FIGS. 4-6, a partition 20 having at least one opening therein is sealingly disposed within the vessel 11 whereby first and second compartments 22 and 24, respectively, are formed therein. The inlet connection 12 opens into the first compartment 22 and the outlet connection 14 communicates with the second compartment 24.

Figure 1:
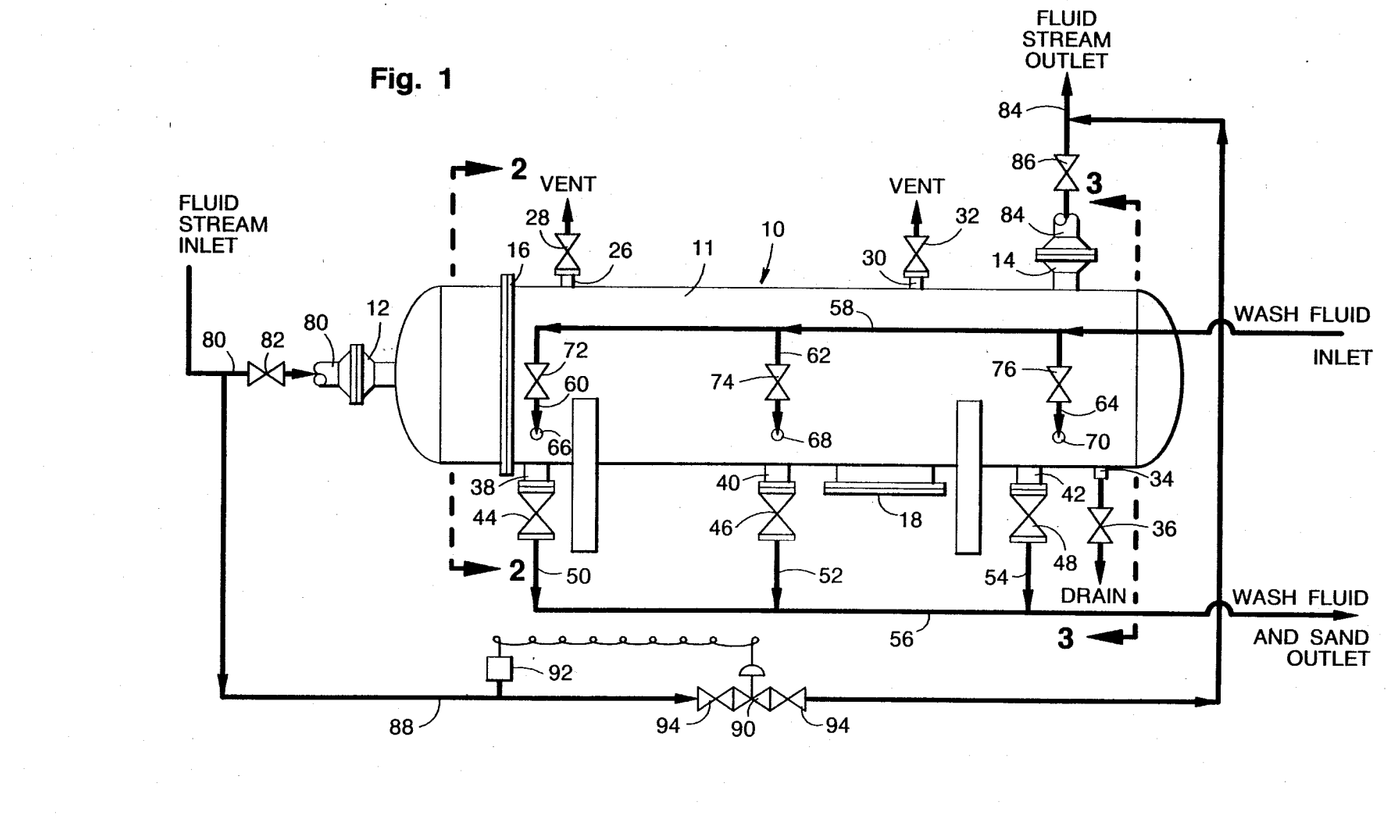
FIG. 1 is a side partly schematic illustration of the apparatus of the present invention.
Figure 2:
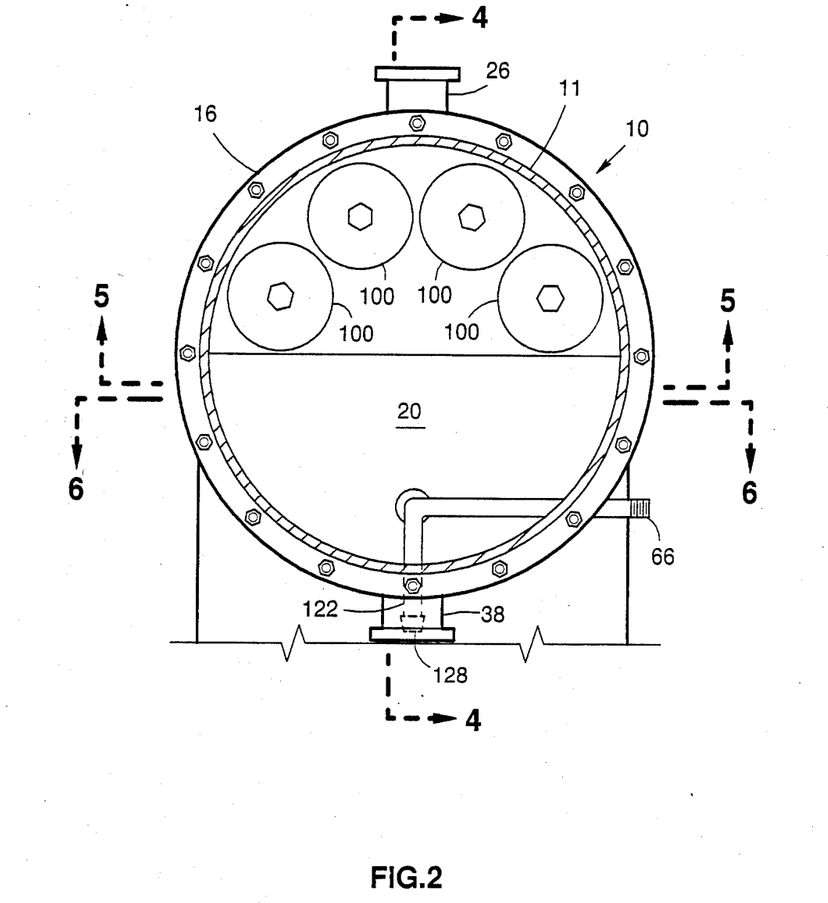
FIG. 2 is a cross-sectional view taken along line 2—2 of FIG. 1.
Figure 3:
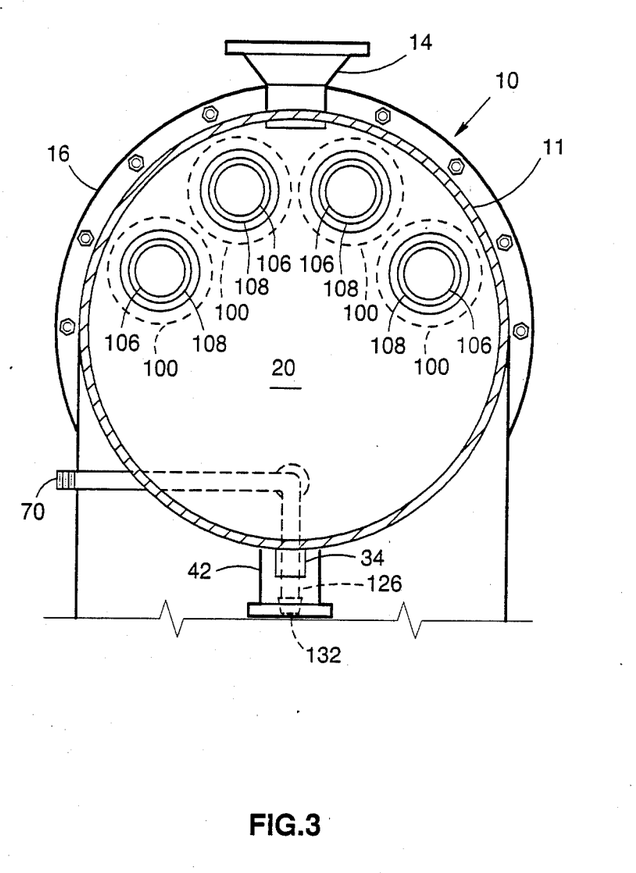
FIG. 3 is a cross-sectional view taken along line 3—3 of FIG. 1.

Referring now specifically to FIG. 1, a relief valve 28 is connected to a connection 26 attached at the top of the vessel 11 in communication with the first compartment 22 therein. A shut-off valve 32 for manually venting the vessel 11 is connected to a connection 30 at the top of the vessel 11 also communicating with the first compartment 22. A drain connection 34 which opens into the second compartment 24 is attached to the vessel 11 at the bottom thereof, and a drain shut-off valve 36 is connected to the connection 34. At least one, and preferably three, sand outlet connection 38, 40 and 42 are attached to the bottom of the vessel 11, all of which open into the first compartment 22 therein. Shut-off valves 44, 46 and 48 are attached to the connections 38, 40 and 42, respectively, and the shut-off valves 44, 46 and 48 are connected by conduits 50, 52 and 54, respectively, to a wash fluid and sand outlet header 56. As is also shown in FIG. 1, a wash fluid inlet header 58 is provided connected by conduits 60, 62 and 64 to conduits 66, 68 and 70, respectively, disposed through a wall of the separator vessel 11. Wash fluid shut-off valves 72, 74 and 76 are disposed in the conduits 60, 62 and 64, respectively.

As shown schematically in FIG. 1, the apparatus 10 includes an inlet conduit 80 for conducting a fluid stream to the vessel 11 connected to the connection 12 thereof. A shut-off valve 82 is disposed in the conduit 80. An outlet conduit 84 having a shut-off valve 86 disposed therein is connected to the outlet connection 14 of the vessel 11. A bypass conduit 88 is connected between the inlet conduit 80 upstream of the shut-off valve 82 therein and the outlet conduit 84 downstream of the shut-off valve 86 therein. Disposed in the conduit 88 are a pair of shut-off valves 94 surrounding a control valve 90 which is operably connected to a pressure controller 92.

As best shown in FIGS. 2-5, at least one, and preferably four or more, tubular filter elements 100 are disposed in the first compartment 22 of the vessel 11. Each of the filter elements 100 is supported within the upper portion of the first compartment 22 by a pair of support members 102 and 104 with one end thereof removably and sealingly attached to an opening in the partition 20. More specifically, open ends 106 0f the tubular filter elements 100 are threadedly connected to complementary threaded fittings 108 welded or otherwise sealingly attached within or around openings in the partition 20.

Attached within the first compartment 22 of the vessel 11 adjacent the inlet connection 12 thereof is an inlet fluid stream diverting baffle generally designated by the numeral 110 (FIGS. 4 and 5). The baffle 110 functions to break the momentum and change the direction of the inlet fluid stream whereby the separation of sand contained in the fluid stream is promoted and the fluid stream is prevented from direct impact with the filter elements 100 or sand accumulated in the vessel 11. While the baffle 110 can take various forms, it is preferably of a shape which causes the inlet fluid stream to be diverted upwardly and/or horizontally, but no downwardly whereby sand accumulated in the bottom of the first compartment is disturbed thereby. In a preferred form, the baffle 110 includes a horizontal rectangular top wall 112, a back wall 114 which is inclined whereby the fluid stream striking it is given an upwardly direction and a bottom wall 116 formed of expanded metal grating or the like. When the inlet fluid stream strikes the baffle 110, it is diverted through the open sides thereof in an upward direction and large sand particles fall out of the fluid stream through the grating 116. In addition, because the vessel 11 is of a large diameter as compared to the inlet connection 12, the velocity of the fluid stream is slowed within the vessel 11. The combination of the change in direction and the slowing of the velocity of the fluid stream causes at least the coarser sand particles to be separated therefrom and gravitate to the bottom of the first compartment 22 of the vessel 11. The fluid stream then flows from the first compartment 22 through the porous filter elements 100 and into the second compartment 24 by way of the open ends 106 of the filter elements. The resulting substantially sand-free fluid stream is withdrawn by way of the connection 14 attached at the top of the vessel 11.

The porous filter material of the filter elements 100 has openings therein of a size selected to allow the passage of the fluid stream therethrough but to prevent the passage of sand contained in the fluid stream therethrough whereby the sand is separated from the fluid stream. After separation, the sand gravitates to and is accumulated in the bottom portion of the vessel 11 within the first compartment 22 therein.

Disposed in the bottom portion of the first compartment 22 of the vessel 11 is at least one, and preferably four, tubular filter elements 120. The filter elements 120 are generally smaller than the filter elements 100 but are preferably of the same design and porosity as the filter elements 100. That is, the porous filter material of the filter elements 120 preferably has openings therein of the same size as the openings in the porous material of the filter elements 100, i.e., a size selected to prevent the passage of sand contained in the fluid stream therethrough.

The filter elements 120 are preferably centrally positioned within the lower portion of the first compartment 22 in a line parallel with the axis of the vessel 11, as illustrated in FIGS. 4 and 6. The first filter element 120 is preferably connected to the conduit 66 with the middle two filter elements 120 connected to the conduit 68 and the rearward filter element 120 connected to the conduit 70. The wash liquid conduits 66, 68 and 70 are positioned to extend over the sand outlet connections 38, 40 and 42. Connected to the conduits 66, 68 and 70 are additional conduits 122, 124 and 126, respectively, which extend into the connections 38, 40 and 42. The ends of the conduits 122, 124 and 126 terminating within the connections 38, 40 and 42 have nozzles 128, 130 and 132, respectively, connected thereto. The nozzles 128, 130 and 132 include orifices therein sized to produce jets of wash liquid which forceably flow into the valves 44, 46 and 48 connected to the connections 38, 40 and 42.

Figure 7:
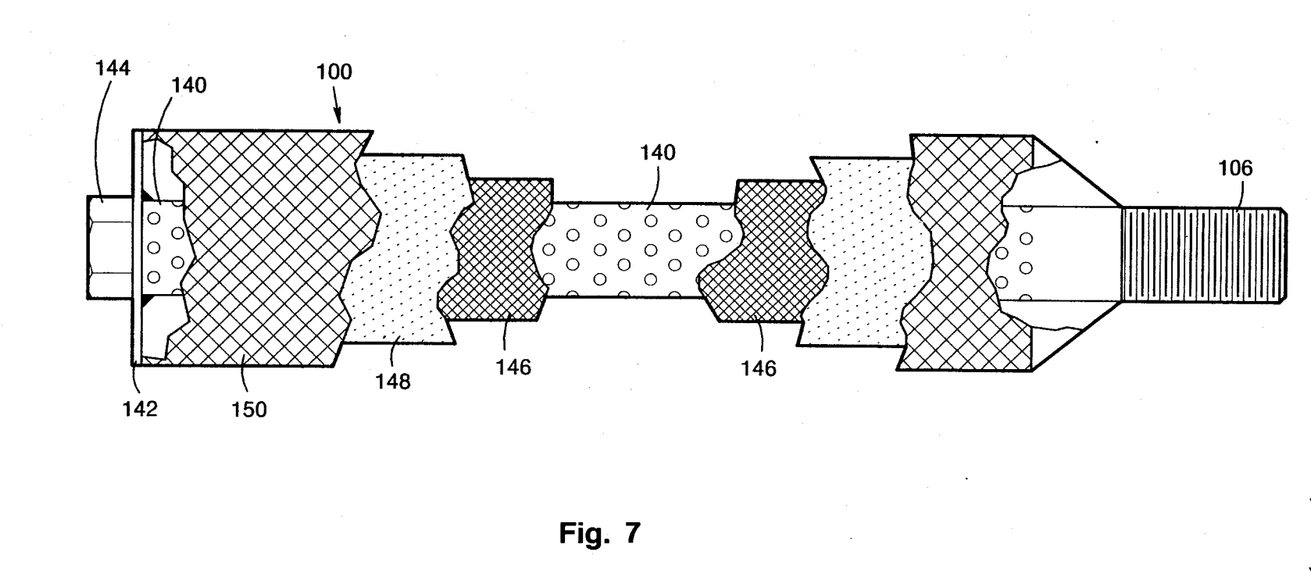
FIG. 7 is an enlarged cutaway view of a filter element utilized in accordance with the present invention.

Referring now to FIG. 7, one of the filter elements 100 is illustrated in detail. As shown in FIG. 7, the filter elements 100 are each comprised of an elongated perforated tube 140 having an open end 106 which is threaded for removable attachment to the fittings 108 attached to the partition 20 previously described. The opposite end of the tube 140 is welded or otherwise attached to a plate 142 having a hexhead portion 144 for facilitating the threaded connection and disconnection of the element 100 to a connector 108. Disposed over the perforations in the tube 140 is a first wire mesh screen 146. A covering 148 formed of porous bonding material is adhered to the screen 146 and a second wire mesh screen 150 is positioned over and adhered to the porous material 148. As will be understood by those skilled in the art, the size of the openings in the screens 146 and 150 as well as the size of the openings in the porous bonding material 148 are selected to allow the passage of fluid therethrough with an acceptable pressure drop thereacross while preventing the passage of sand carried by the fluid. Filter elements of the type described herein are commercially available and are sometimes referred to as prepacked gravel pack screens. Such screens are often used in well completions for sand control.

As indicated above, the filter elements 120 are preferably of the same type with the same sizes of openings in the screens and porous material as the filter elements 100 whereby sand is prevented from passing through the filter elements and entering the wash liquid conduits connected thereto. It is to be understood, however, that while such tubular filter elements are presently preferred for use in accordance with the present invention, a variety of other filter means of different construction utilizing various other porous filter media can be utilized.

OPERATION OF THE APPARATUS 10

Referring again to FIG. 1, a fluid stream containing sand, such as a stream of produced well fluids, is conducted by way of the conduit 80 through the shut-off valve 82 disposed therein and the inlet connection 12 into the interior of the separator vessel 11. After passing through the separator vessel 11 and having the sand contained therein separated and removed therefrom in the manner described above, the substantially sand-free fluid stream exits the vessel 11 by way of the outlet connection 14 and flows through the conduit 84 and shut-off valve 86 to a point of further processing or use. If the pressure within the vessel 11 reaches a high level as a result of the filter means contained therein becoming plugged or other reason, the relief valve 28 opens to relieve fluid pressure therefrom. Other safety pressure relief devices such as additional relief valves or one or more rupture disk assemblies can also be utilized to insure the safe relief of excessive pressure from within the vessel 11. In addition, if the pressure drop through the vessel 11 becomes too high for any reason, the pressure controller 92 senses the resulting increase in upstream pressure and opens the control valve 90 whereby the fluid stream flowing to the separator vessel 11 is bypassed by way of the conduit 88 to the outlet conduit 84.

When it is necessary or desirable to gain access to the interior of the separator vessel 11, such as to change the filter means therein, the flow of the fluid stream can be shut off or the fluid stream can be bypassed by opening the valves 90 and 94 in the bypass conduit 88. The separator vessel 11 is then isolated by closing the shut-off valves 82 and 86 upstream and downstream thereof. The separator vessel 11 is vented by opening the shut-off valve 32 followed by the opening of the closure member 18 and removal of the forward end portion of the separator vessel 11 by disconnecting the flange 16 and the flange connection 12.

When sand which has accumulated within the first compartment of the separator vessel 11 is to be removed therefrom, the separator vessel 11 is isolated as described above. The vent valve 32 is opened to relieve pressure from the vessel 11 and the sand outlet shut-off valves 44, 46 and 48 are opened. Wash fluid is next introduced into the vessel 11 by opening the shut-off valves 72, 74 and 76 whereby wash fluid flows from the header 58 through the conduits 60, 62 and 64 and the conduits 66, 68 and 70 and is discharged through the filter elements 120 connected thereto. Portions of the wash liquid flow through the conduits 122, 124 and 126 and are discharged in high velocity jets from the nozzles 128, 130 and 132 connected thereto. The jets of wash liquid discharged from the nozzles 128, 130 and 132 extend into the open shut-off valves 44, 46 and 48 whereby sand contained therein is readily removed and the flow of wash liquid and sand through the outlet connections 38, 40 and 42 and shut-off valves 44, 46 and 48 into the header 56 is insured. From the header 56 the wash fluid and sand are conducted to a point of disposal.

The wash fluid discharged into the vessel 11 by way of the filter elements 120 cause sand accumulated in the bottom portion of the first compartment 22 to be washed into the outlet connections 38, 40 and 42 from where the sand is removed. Once substantially all of the sand accumulated within the vessel 11 has been removed, the wash liquid inlet valves 72, 74 and 76 are closed followed by the closing of the drain valves 44, 46 and 48. The shut-off valves 82 and 86 are then opened and the control valve 90 closed whereby the fluid stream again flows through the separator vessel 11 and sand is removed therefrom.

As described above, and referring specifically to FIGS. 2-6, the fluid stream entering the vessel 11 by way of the inlet connection 12 thereof impacts the baffle 110 and is caused to change direction. In addition, the velocity of the fluid stream is reduced when it enters the first compartment 22 of the separator vessel 11, both of which events cause a portion of the sand carried by the fluid stream to separate therefrom and gravitate to the bottom of the first compartment 22. The final separation of sand from the fluid stream is brought about by the filter elements 100 as the fluid stream flows therethrough. That is, the filter elements 100 allow the passage of the fluid stream therethrough and into the second compartment 24 but prevent the passage of substantially all of the sand particles remaining in the fluid stream which are filtered out of the fluid stream and fall to the bottom of the first compartment 22. The resulting filtered fluid stream exits the separator vessel 11 and the second compartment 24 therein by way of the outlet connection 14 which, by being positioned at the top of the separator vessel 11 prevents fluid vapor from accumulating in the vessel and reducing the effectiveness of the filter elements 100.

When the filter elements 100 and/or filter elements 120 connected to the wash liquid conduit system require changing, they can be easily threadedly disconnected and replaced. As mentioned, the filter elements 120 through which the wash liquid is discharged prevent sand from settling or otherwise finding its way into the wash liquid conduits and clogging the conduits. In order to facilitate the efficient washing of accumulated sand from the first compartment 22, three separate wash liquid conduit systems are provided connected to the wash fluid header 58 whereby they can be turned on individually to provide a high concentration of water into each one-third portion of the first compartment 22. In addition, the jets of wash liquid directed into the shut-off valves 44, 46 and 48 connected to the outlets 38, 40 and 42 insure that the shut-off valves and outlets do not become or remain clogged with sand when the sand washing process is carried out.

While presently preferred embodiments of the invention have been described herein for the purpose of disclosure, numerous changes in the construction and arrangement of parts will suggest themselves to those skilled in the art, which changes are encompassed within the spirit of this invention as defined by the appended claims.

What is claimed is:

1. An apparatus comprising: means for removing sand from the interior of a separator vessel, the separator vessel including a closed separator vessel including an upper interior surface and a lower interior surface, an inlet for introducing a fluid stream into the separator vessel, first filter means for separating sand from the fluid stream disposed within the separator vessel adjacent the upper interior surface, the first filter means including an outlet for discharging the fluid stream from which sand has been separated and removed, a fluid outlet in fluid communication with the outlet in the first filter means for discharging the fluid stream from the separator vessel, at least one sand discharge outlet for removing separated sand from the interior of the separator vessel, and means for washing separated sand from the interior of the separator vessel comprising at least one wash conduit extending into a lower portion of the separator vessel for introducing a wash liquid, an outlet end of the at least one wash conduit including second filter means spaced above the lower interior surface of the separator vessel for preventing the entry of sand into the at least one wash conduit.

2. The apparatus of claim 1 wherein the first filter means comprises at least one perforated tube covered by at least one layer of porous material having openings therein of a size selected to prevent the passage of sand therethrough.

3. The apparatus of claim 1 wherein the second filter means comprises at least one perforated tube covered by at least one layer of porous material having openings therein of a size selected to prevent the passage of sand therethrough.

4. The apparatus of claim 1 wherein the filter means is spaced above the lower interior surface of the separator vessel.

5. The apparatus of claim 1 and including nozzle means for preventing sand from clogging the sand discharge outlet, the nozzle means comprising a conduit in communication with the at least one wash conduit, and a jet nozzle on an outlet end thereof for directing a flow of wash liquid directly towards the sand discharge outlet.

6. The apparatus of claim 1 wherein the means for separating sand comprises an elongated filter disposed within the separator vessel adjacent an upper interior surface and including an outlet for discharging the fluid stream from which sand has been separated and removed to the fluid outlet.

* * * * *